United States Patent [19]
Bennett

[11] 3,887,238
[45] June 3, 1975

[54] TRACTOR-TRAILER BRAKING SYSTEM WITH VARIABLE MOTOR SPEED CONTROL DEVICE

[75] Inventor: Ronald W. Bennett, Miamisburg, Ohio

[73] Assignee: General Motors Corporation, Detroit, Mich.

[22] Filed: Mar. 13, 1974

[21] Appl. No.: 450,839

[52] U.S. Cl. .................... 303/7; 188/3 R; 303/10
[51] Int. Cl. ............................................ B60t 13/16
[58] Field of Search ............... 303/7, 10, 15, 21 F; 188/3, 355, 358; 91/436, 437, 49

[56] References Cited
UNITED STATES PATENTS

| | | | |
|---|---|---|---|
| 3,350,142 | 10/1967 | Schuman | 303/7 |
| 3,398,992 | 8/1968 | Littman | 303/15 |
| 3,659,905 | 5/1972 | Goulish | 303/21 F |
| 3,691,903 | 9/1972 | Shellhouse | 91/49 |
| 3,790,807 | 2/1974 | Rossigno | 303/7 |
| 3,827,758 | 8/1974 | Hansen | 303/10 X |

Primary Examiner—Trygve M. Blix
Assistant Examiner—D. C. Butler
Attorney, Agent, or Firm—D. D. McGraw

[57] ABSTRACT

A vehicle brake system, particularly adapted for tractor and trailer usage, in which the first brake subsystem, on the tractor, includes a master cylinder operating the tractor brakes in response to actuation of a hydraulic brake booster which receives power pressure from the power steering gear pump. The booster has a secondary power pressure source which is in electric motor driven pump actuated when the power steering gear pump does not supply fluid to the brake booster. This type of system is known in the prior art, being utilized on medium trucks manufactured by the assignee of this invention. The second brake subsystem includes a similar hydraulic brake booster and master cylinder arrangement with an electric motor driven pump which provides pressure to the second subsystem booster in capacity and duration which correspond to the capacity and duration of the brake actuation in the first brake subsystem. This booster is so arranged that it is operated when such pressure is supplied thereto and does not require an independent valve-control operation. The booster is also supplied with a normally open bypass valve which balances pressures throughout the booster to permit brake release, the bypass valve being closed when the electric motor driven pump is operating. A motor proportional control circuit is operated by pressure sensing device connected in the brake apply pressure circuit of the first brake subsystem. This sensing means sends signals to the motor proportional control circuit which correspond to the presence of brake apply pressure and the amount of brake apply pressure. The controls therefore cause the second brake subsystem to be operated in proportion to the operation of the first subsystem.

4 Claims, 1 Drawing Figure

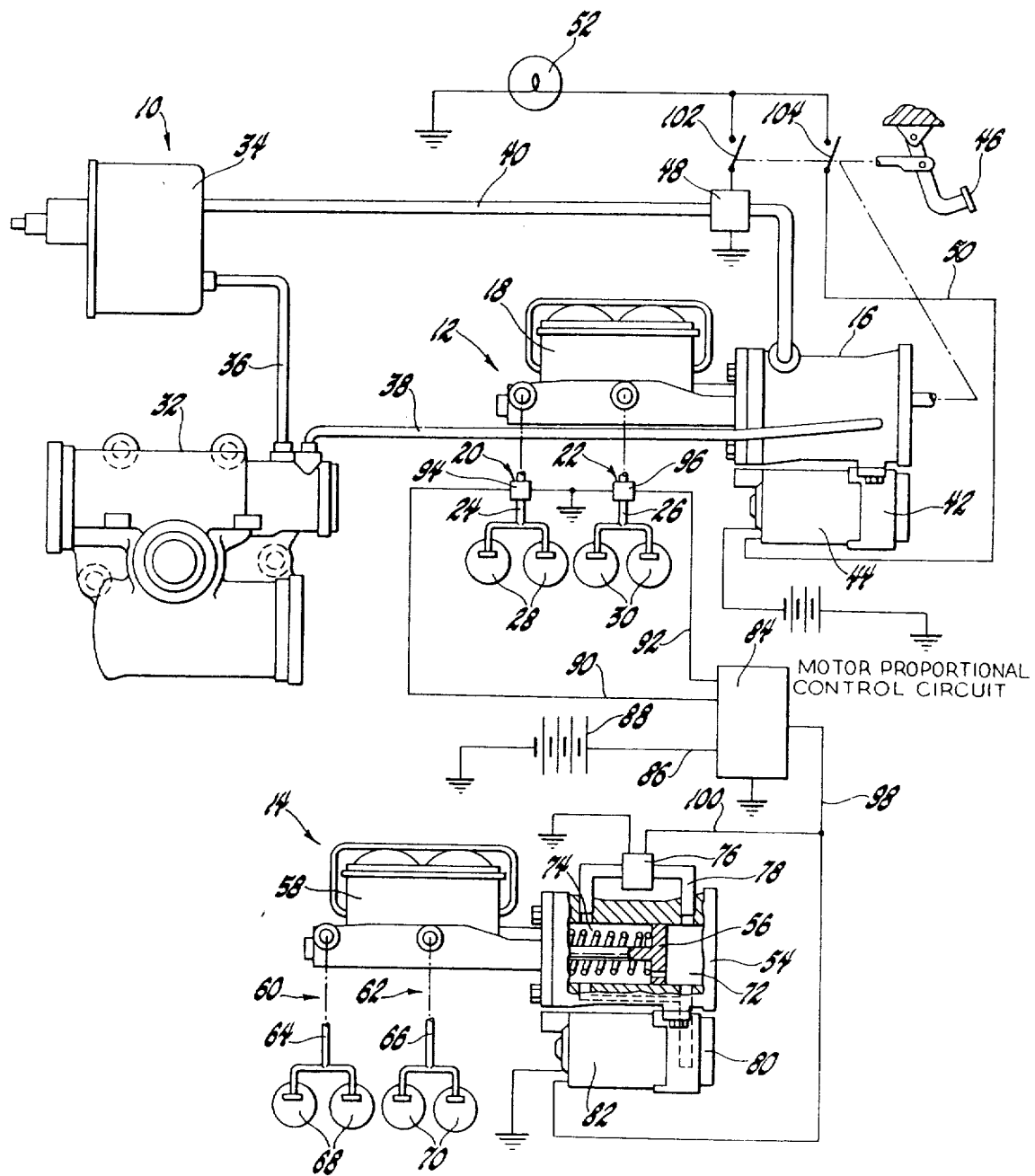

TRACTOR-TRAILER BRAKING SYSTEM WITH VARIABLE MOTOR SPEED CONTROL DEVICE

The invention relates to a vehicle brake system having brake subsystems wherein the capacity and duration of application of one brake subsystem is utilized to control the capacity and duration of application of another brake subsystem by means of an electric motor driven brake booster pump, a motor proportional control circuit and first brake subsystem pressure sensing means, and a pressure actuated and controlled brake booster in the second subsystem. The invention is particularly applicable to vehicles of the tractor and trailer type since such vehicles commonly have their trailers connected and disconnected from the tractors as the trailers are loaded, unloaded, hauled between destinations, and stored. It is simple and reliable to provide electric connections for the purpose, therefore obviating the need to open hydraulic or pneumatic lines between the tractors and trailers when disconnecting them. The invention may also be used on other types of vehicles.

It is a feature of the invention that the first brake subsystem, which when used in a tractor and trailer arrangement is normally the tractor braking system, includes brake apply pressure sensing means which sends electric signals corresponding to the amount of brake apply pressure generated and also indicates whether or not any brake apply pressure is being generated in the first brake subsystem. It is recognized that other pressures in the brake booster and master cylinder assembly may be sensed to accomplish a similar purpose. The power pressure actuating the first subsystem booster may be sensed, for example.

The secondary brake subsystem, provided on the trailer, includes a hydraulic brake booster and master cylinder assembly connected to operate the trailer brakes. An electric motor driven pump is connected with the booster, the motor being driveable at varying speeds to provide the desired amount of hydraulic power pressure to the booster and thereby control the amount of brake apply pressure generated by the master cylinder. The electric motor of the pump has a motor proportional control circuit receiving the signals from the pressure sensing means earlier described. This circuit controls the motor in accordance with those signals, energizing the motor when the pressure sensing means senses the presence of pressure, and driving the motor at whatever speeds are necessary to generate the necessary amount of hydraulic power pressure to actuate the brake booster associated therewith and therefore cause its master cylinder to generate brake apply pressures which are proportional in capacity and duration to those of the first brake subsystem.

It is another feature of the invention to provide a normally open brake booster bypass valve for the second brake subsystem booster which effectively prevents booster actuation by equalizing the pressures throughout the booster when the valve is open. The valve is provided with a solenoid control for closing the valve and the solenoid is energized to close the valve whenever the electric motor is operating. Thus upon first receiving a signal indicating the presence of any brake apply pressure in the first brake subsystem, the bypass valve is closed and remains closed until the signal indicates that no brake apply pressure is present in the first brake subsystem. This permits the second brake subsystem master cylinder and booster to return to the brake release position when that action is desired.

IN THE DRAWING

The single FIGURE is a schematic representation of a brake system embodying the invention with parts broken away and in section.

The system 10 schematically illustrated in the drawing includes a first brake subsystem 12 and a second brake subsystem 14. The subsystem 12 includes a brake booster 16 connected to operate a master cylinder 18. The master cylinder generates brake apply pressures in a pair of brake circuits 20 and 22. These circuits may respectively provide braking force for the front and rear wheel brakes of a truck tractor, for example. The circuits have conduits 24 and 26, with conduit 24 connected to a set of brakes 28 and conduit 26 connected to a set of brakes 30.

The brake booster 16 is of the hydraulic power pressure type such as that disclosed and claimed in U.S. Pat. No. 3,691,903, entitled "Hydraulic Power Brake Booster," for example. The booster is illustrated as being connected in series with the vehicle power steering gear 32 and the power steering pump 34. The pump 34 delivers fluid through conduit 36 to the power steering gear and then through conduit 38 to the booster 16. The hydraulic fluid is then returned to the reservoir of pump 34 through conduit 40. This system provides the booster with its primary source of power pressure. In this arrangement both the power steering gear and the booster are preferably of the open center type so that when neither the steering gear nor the booster is operational the pump circulates fluid therethrough at a normal flow but only nominal pressure. When either of these units is actuated, the valving of the actuated unit tends to restrict flow to build up pressure for power. This type of operation is more fully disclosed in the above noted patent.

The booster 16 is also provided with a secondary power pressure source which includes pump 42 and electric motor 44. The pump is directly connected to the booster housing and is so arranged so that when motor 44 is actuated the pump will circulate fluid through the brake booster. When the brake booster is actuated by movement of the brake pedal 46, pressure is built up as before to provide booster power. The secondary pressure source is actuated in any suitable manner, and is schematically illustrated as being actuated when a flow sensitive switch 48 in conduit 40 senses insufficient flow to provide the necessary booster power if needed. This switch controls the electric circuit 50 of motor 44, and may also energize an indicating lamp 52. This type of secondary source arrangement is also disclosed in the above noted patent.

The second brake subsystem 14 includes a brake booster 54 which is schematically illustrated as having a power piston 56 for actuating the master cylinder 58. The master cylinder generates brake apply pressures for brake circuits 60 and 62. These circuits respectively include conduits 64 and 66, and sets of brakes 68 and 70. In one use of the invention these brakes may be trailer brakes on a trailer connected to the truck tractor in which brake subsystem 12 is installed.

The booster 54 has a power chamber 72 and an exhaust chamber 74 schematically represented as being on either side of piston 56. A booster bypass valve 76 is schematically illustrated as being in a bypass passage 78 connecting chambers 72 and 74. Valve 76 is normally open and is provided with an electric solenoid operator which closes the valve when the solenoid is energized. A pump 80 is connected to booster 54 and is driven by an electric motor 82. Motor 82 is capable of being energized and deenergized and when energized is capable of running at various speeds so that the pump 80 is driven by the motor to produce different pressure levels in power chamber 72. In general, the pump 80 and motor 82 are similar to pump 42 and motor 44. However, the control for motor 82 is different.

A motor proportional control circuit 84, which may be of any suitable type, is schematically illustrated as a box having connected to it electric lead 86 from a power source such as battery 88; electric leads 90 and 92, which are respectively connected to pressure sensing devices 94 and 96; and electric lead 98 which is connected to motor 82. Another electric lead 100 connects lead 98 to the solenoid of the normal open bypass valve 76. The various electric elements are suitably grounded.

In normal vehicle operation, the vehicle engine is driving pump 34 and fluid is being circulated through conduits 36, 38 and 40 at a low pressure and at sufficiently high flow so that switch 48 is open. All of the brakes are in the released condition of operation. Neither electric motor 44 nor electric motor 82 is energized. When the brakes are applied, brake pedal 46 is depressed to actuate brake booster 16. The booster power pressure builds up, as is well known in the art, and the booster actuates master cylinder 18. Brake apply pressures are therefore generated in brake circuits 20 and 22 to apply brakes 28 and 30. The presence of brake apply pressures in conduits 24 and 26 are respectively sensed by units 94 and 96. Two such units are used, one in each brake circuit. However the sensing action of either unit is sufficient for the control purposes to be described. These units generate signals transmitted through electric leads 90 and 92 to the motor proportional control circuit, the signals indicating the fact that apply pressure exists, and the amount of apply pressure. These signals act in the motor proportional control circuit to energize the solenoid which closes bypass valve 76. The speed at which motor 82 is driven depends upon the capacity or quantity of brake apply pressure generated in circuits 20 and 22. The greater the brake apply pressure, the higher the speed of motor 82. Pump 80 is driven by motor 82 and increases the pressure in power chamber 72 of booster 54 in accordance with the speed at which the pump is driven. Therefore booster 54 is actuated in proportion to the amounts of brake apply pressures generated by master cylinder 18. In some instances it may be preferable to have the sensing units sense the booster power pressure of booster 16 rather than the output pressures from the master cylinder 18.

Under the operating conditions above described the brakes 28 and 30 are applied under control of the vehicle operator by movement of brake pedal lever 46 and the application of brakes 68 and 70 is in proportional relation to the application of brakes 28 and 30. When the system is used on a tractor and trailer vehicle, provision for connecting and disconnecting the tractor and trailer may include connectors in electric leads 90 and 92, for example, or in electric lead 98. This obviates the necessity of connecting and disconnecting either hydraulic or air brake lines or controls.

When the brakes are to be released, brake pedal 46 is released by the vehicle operator and booster 16 again permits the relatively unrestricted flow of fluid therethrough so that the booster and the master cylinder return to the brake release position. The brake apply pressures sensed by units 94 and 96 are therefore decreased and eliminated and motor proportional control circuit 84 therefore decreases the speed of and then deenergizes electric motor 82. Upon such deenergization of the motor, the solenoid for valve 76 is also deenergized and bypass passage 78 is opened. This permits free flow of any fluid under pressure in chamber 72 to return to chamber 74, permitting piston 56 to move to the released position and thereby releasing master cylinder 58. Brakes 68 and 70 are therefore deenergized. If there is insufficient flow in conduit 40 before or during brake application, switch 48 closes. Upon brake application the brake pedal 46 closes switches 102 and 104 to complete the circuit which energizes motor 44 and lamp 52. Motor 44 is therefore immediately driven at its normal full operational speed to provide brake power pressure to booster 16 under control of the booster valving as actuated by brake pedal 46. The second brake subsystem 14 will still operate in the same manner as before.

What is claimed is:

1. A vehicle tractor and trailer brake system comprising:

a tractor brake system including means generating pressure for system brake operation in accordance with the braking effort demand of the vehicle operator, a trailer brake system including a brake booster having as a power pressure source a pump and a variable speed electric motor driving said pump to generate the booster power pressure, pressure transducer means in said tractor brake system sensing the pressure of and the amount of said generated pressure, and an electric motor control circuit electrically connected to said pressure transducer means and said electric motor to control the operation of said pump in accordance with the sensing action of said transducer to generate booster power pressure in said tractor brake system brake booster which is directly proportional to the sensed pressure generated in said tractor brake system.

2. A vehicle brake system comprising:

a first brake subsystem and a second brake subsystem each having a hydraulic pressure powered brake booster, a master cylinder operated by the brake booster, brakes applied by hydraulic pressure generated in the master cylinder in response to operation of the brake booster, and conduit means connecting the brakes and the master cylinder;

a primary hydraulic power pressure source for said first brake subsystem booster and normally operable to supply hydraulic fluid thereto under pressure;

a secondary hydraulic power pressure source for said first brake subsystem booster including an electric motor, a pump driven thereby, and control means sensitive to loss of fluid supply from said primary source to actuate said electric motor to drive said pump;

a hydraulic power pressure source for said second brake subsystem booster including a second electric motor and a second pump driven thereby which are substantially identical to said secondary hydraulic power pressure source for said first brake subsystem booster;

and variable motor speed control means for said second motor sensitive to actuation of said first brake subsystem to generate hydraulic power pressure actuating said second brake subsystem booster in braking capacity and duration in accordance with the actuation of said first brake subsystem in braking capacity and duration.

3. A vehicle brake system comprising:

a first brake subsystem and a second brake subsystem each having a hydraulic pressure powered brake booster, a master cylinder operated by the brake booster, brakes applied by hydraulic pressure generated in the master cylinder in response to operation of the brake booster, and conduit means connecting the brakes and the master cylinder;

a hydraulic power pressure source for said first brake subsystem booster and operable to supply hydraulic fluid thereto under pressure;

a hydraulic power pressure source for said second brake subsystem booster including an electric motor and a pump driven thereby;

variable motor speed control means for said motor sensitive to actuation of said first brake subsystem to generate hydraulic power pressure actuating said second brake subsystem booster in braking capacity and duration in accordance with the actuation of said first brake subsystem in braking capacity and duration;

and means sensing brake apply pressure in said conduit means of said first brake subsystem and controlling the energization and speed of said second brake subsystem electric motor through said variable motor speed control means in accordance with the brake apply pressures generated by the first brake subsystem master cylinder and delivered through said first brake subsystem conduit means to said first brake subsystem brakes whereby the brake apply pressures in said second brake subsystem are directly proportional to those of said first brake subsystem.

4. In a vehicle brake system having a first subsystem and a second subsystem with each of said subsystems having a brake booster, a master cylinder operated thereby, and brakes operated in pressure level and duration by pressure generated by said master cylinder:

a pump having a variable speed electric motor driving it, said pump supplying power pressure to said second subsystem brake booster in pressure level and duration to actuate said second subsystem brakes in pressure level and duration corresponding to the operation of said second subsystem brakes;

variable speed control means for said electric motor including a motor proportional control circuit, means sensing the pressure level and duration of actuation of said first subsystem brakes and delivering corresponding signals to said motor proportional control circuit to cause corresponding operation of said motor;

and a normally open, solenoid closable, bypass valve fluidly connected in said second subsystem brake booster to balance power and exhaust pressures therein when open, the solenoid of said bypass valve being connected with said motor proportional control circuit to close said bypass valve at all times that said motor is operated and to permit said bypass valve to open when said motor is not operated so as to relieve any pressure in said second subsystem booster tending to prevent or delay releasing action of said second subsystem master cylinder when the motor is not operating.

* * * * *